United States Patent
Yamaura et al.

(10) Patent No.: US 6,683,892 B1
(45) Date of Patent: Jan. 27, 2004

(54) LASER DEVICE, METHOD OF PRODUCING THE SAME AND COMPOSITE OPTICAL MEDIUM FOR USE IN PRODUCING THE SAME

(75) Inventors: Hitoshi Yamaura, Akishima (JP); Hiroshi Sekiguchi, Akishima (JP)

(73) Assignee: Hoya Corporation, Tokyo (JP)

( * ) Notice: Subject to any disclaimer, the term of this patent is extended or adjusted under 35 U.S.C. 154(b) by 337 days.

(21) Appl. No.: 09/709,371

(22) Filed: Nov. 13, 2000

(30) Foreign Application Priority Data

Nov. 12, 1999 (JP) .......................... 11-322885

(51) Int. Cl.⁷ .................................. H01S 3/067
(52) U.S. Cl. ................. 372/6; 372/66; 372/70; 385/123; 359/341.1; 359/341.3
(58) Field of Search ................. 372/67, 66, 6, 372/40, 70; 385/104, 27, 123; 359/341.1, 341.3

(56) References Cited

U.S. PATENT DOCUMENTS

| | | | | |
|---|---|---|---|---|
| 3,805,186 A | * | 4/1974 | Woodcock | 372/34 |
| 5,696,863 A | * | 12/1997 | Kleinerman | 250/227.11 |
| 5,923,694 A | * | 7/1999 | Culver | 372/6 |
| 6,052,392 A | * | 4/2000 | Ueda et al. | 372/6 |

FOREIGN PATENT DOCUMENTS

| | | | | |
|---|---|---|---|---|
| EP | 933841 A2 | * | 8/1999 | H01S/03/06 |
| JP | 11-284255 | | 10/1999 | |

* cited by examiner

Primary Examiner—Jerome Jackson
Assistant Examiner—Matthew C. Landau
(74) Attorney, Agent, or Firm—Sughrue Mion, PLLC (57) ABSTRACT

In a longitudinal flexible composite optical medium (3) for use in a laser device, the longitudinal flexible composite optical medium includes a laser beam guide portion (1) containing a laser active material (11) and an excitation beam guide portion (2) for distributing and introducing an excitation beam into the laser beam guide portion. The laser beam guide portion and the excitation beam guide portion are uncoaxially arranged in parallel to each other and integrally coupled with each other. By winding or folding the composite optical medium, a laser structure of a predetermined shape is obtained.

8 Claims, 5 Drawing Sheets

LASER DEVICE, METHOD OF PRODUCING THE SAME AND COMPOSITE OPTICAL MEDIUM FOR USE IN PRODUCING THE SAME

BACKGROUND OF THE INVENTION

This Invention relates to a laser device for oscillating or amplifying a laser beam by supplying an excitation beam to a laser active material contained in a long-sized laser beam guide portion, such as an optical fiber, a method of producing the same, and a composite optical medium for use in producing the same and, in particular, to a laser device, a method, and a composite optical medium of the type which are effectively applicable to the fields of optical communication, optical measurement, and laser machining.

In the fields of optical communication, optical measurement, and laser machining, it is desired to develop a laser device which is higher in output power or efficiency but is lower in cost. Presently, a fiber laser device is known as one of candidates which may possibly satisfy the above-mentioned demand.

The fiber laser device comprises an optical fiber as a laser beam guide portion (a so-called laser medium). The optical fiber comprises a core portion containing a laser active material and a cladding portion coaxially surrounding the core portion. By appropriately selecting the diameter of the core portion and the difference in optical refractive index between the core portion and the cladding portion, a single transverse mode of laser oscillation is relatively easily achieved.

In addition, by confining a light beam within the optical fiber at a high density, it is possible to enhance the interaction between the laser active material and the light beam. Since the length of interaction can be prolonged by increasing the length of the optical fiber, it is possible to generate a laser beam having a high quality in spatial characteristics at a high efficiency. Thus, the laser beam of an excellent quality can be obtained at a relatively low cost.

In order to achieve a higher output power and a higher efficiency of the laser beam, it is required to efficiently introduce an excitation beam to a laser active region (typically, the core portion) of the optical fiber so that the excitation beam is sufficiently absorbed in the laser active material, such as laser active ions, pigments, or any other emission center, added to the laser active region.

However, in order to satisfy a single-mode waveguide condition, the diameter of the core portion must be smaller than 20 $\mu$m. Generally, it is difficult to efficiently introduce the excitation beam to the core portion having such a small diameter.

In order to overcome the above-mentioned difficulty, proposal is made of a fiber laser device and a laser machining device in Japanese Unexamined Patent Publication (JP-A) No. H11-284255. The laser device comprises a laser fiber which has a core containing a laser active material and which is for producing a laser beam from its output end when the laser active material is excited. The laser fiber is, directly or indirectly through an optical medium, brought into contact with an optical guide structure adapted to confine an excitation beam for exciting the laser active material. The laser active material is excited by the excitation beam incident through a contact portion between the laser fiber and the optical guide structure.

Thus, the optical guide structure adapted to confine the excitation beam is used as an excitation beam guide portion. Through the excitation beam guide portion, the excitation beam is introduced from a side surface of the laser fiber as a laser beam guide portion. The excitation beam is introduced in a distributed state in which it is distributed along the length of the laser beam guide portion. By the excitation beam introduced into the laser beam guide portion in the distributed state, the laser active material contained in the laser beam guide portion is excited.

In this case, the introduction of the excitation beam into the excitation beam guide portion can be carried out through an incident prism portion formed at a desired position of the excitation beam guide portion. The excitation beam incident to the excitation beam guide portion is repeatedly reflected in the interior of the excitation beam guide portion to spread throughout the interior of the excitation beam guide portion. Then, the excitation beam is introduced into the laser beam guide portion through the contact portion where the excitation beam guide portion is directly or indirectly brought into contact with the side surface of the laser beam guide portion.

For example the excitation beam guide portion comprises a hollow cylindrical structure or a flat disk-shaped structure. The excitation beam guide portion is supplied with the excitation beam from an excitation light source and transmits the excitation beam which is confined therein by internal reflection. The laser beam guide portion is brought into optical contact with the surface of the excitation beam guide portion over a predetermined length. For example, the laser beam guide portion in the form of a fiber is wound around the structure forming the excitation beam guide portion. Thus, the excitation beam confined within the excitation beam guide portion is incident into the laser beam guide portion through the contact portion.

With the laser device having the above-mentioned excitation structure, it is easy to introduce the excitation beam into the laser beam guide portion in the form of a fiber. In addition, the excitation beam can be introduced through a desired position on the structure forming the excitation beam guide portion. This facilitates the excitation by the use of a plurality of excitation light sources. In contrast, the excitation beam is introduced only through opposite end faces of the fiber in the conventional laser device.

The conventional laser device described above is produced through the steps of forming the structure as the excitation beam guide portion and winding the laser beam guide portion in the form of a fiber around the structure. However, this process involves the following problem.

In the above-mentioned conventional laser device, optical coupling between the excitation beam guide portion and the laser beam guide portion is weak or at least insufficient. In order to make the laser beam guide portion fully absorb the excitation beam, it is required to extend the area of distributed introduction of the excitation beam. For this purpose, the laser beam guide portion must be brought into contact with the excitation beam guide portion over a distance as long as possible.

In other words, in order to efficiently excite the laser active material contained in the laser beam guide portion, the laser beam guide portion must be sufficiently long. Consequently, the excitation beam guide portion must have a surface area sufficient to receive the laser beam guide portion of such a long size attached or wound therearound. This is an inhibiting factor which makes it difficult to improve the efficiency of the laser device of the type and to reduce the cost.

As described above, the excitation beam guide portion must have a large surface area in order to extend the area of distributed introduction of the excitation beam into the laser beam guide portion. On the other hand, the excitation beam guide portion is required to have an internal volume as small as possible in order to reduce transmission loss of the excitation beam. If the internal volume of the excitation beam guide portion is large, the transmission distance of the excitation beam within the excitation beam guide portion is increased to thereby increase the transmission loss.

For example, the excitation beam guide portion is formed into a hollow cylindrical shape or a flat disk shape. In order to reduce the transmission loss, the structure must be as thin as possible. However, when such a thin structure is formed by molding or machining an optical material such as a glass, the production cost inevitably becomes high.

Furthermore, the above-mentioned problems will cause another problem of decreasing the degree of freedom related to the shape of the laser device.

As described above, in the laser device comprising the long-sized flexible laser beam guide portion such as the optical fiber and the excitation beam guide portion for introducing the excitation beam into the laser beam guide portion in the distributed state, optical coupling between the excitation beam guide portion and the laser beam guide portion is weak. In order to enhance the excitation efficiency by overcoming the weakness of the optical coupling, the production cost inevitably becomes high because of the problem in the production process and the degree of freedom related to the shape of the laser device is decreased.

SUMMARY OF THE INVENTION

It is therefore an object of this invention to provide a laser device comprising a laser beam guide portion containing a laser active material and an excitation beam guide portion for guiding an excitation beam, which is capable of assuring sufficient optical coupling between the laser beam guide portion and the excitation beam guide portion to efficiently introduce the excitation beam into the laser beam guide portion and which is capable of achieving a high degree of freedom related to the shape of the laser device.

It is another object of this invention to provide a method of producing the laser device mentioned above.

It is still another object of this invention to provide a composite optical medium adapted to form the laser device mentioned above.

According to a first aspect of this invention, there is provided a laser device comprising a longitudinal flexible composite optical medium (that is, a long-sized flexible composite optical medium) which comprises:

a laser beam guide portion containing a laser active material; and an excitation beam guide portion for distributing and introducing an excitation beam into the laser beam guide portion;

the laser beam guide portion and the excitation beam guide portion being uncoaxially arranged in parallel to each other and integrally coupled with each other, the composite optical medium being wound or folded to form a predetermined shape.

Preferably, at least one part of the excitation beam guide portion of the composite optical medium is optically connected to another part of the excitation beam guide portion which is adjacent to the one part as a result of winding or folding.

Preferably, at least one part of the excitation beam guide portion of the composite optical medium is integrally coupled by the use of fusion-bonding, optical contact, or resin to another part of the excitation beam guide portion which is adjacent to the one part as a result of winding or folding.

Preferably, at least one part of the excitation beam guide portion of the composite optical medium is integrally coupled, to form an integrally coupled portion, by the use of fusion-bonding, optical contact, or resin with another part of the excitation beam guide portion which is adjacent to the one part as a result of winding or folding, the laser device further comprising an excitation beam introducing portion formed at the integrally coupled portion for introducing the excitation beam into the excitation beam guide portion.

Preferably, the laser device further comprises a plurality of excitation beam introducing portions formed at a plurality of positions of the excitation beam guide portion of the composite optical medium wound or folded, the excitation beam introducing portions being for introducing the excitation beam into the excitation beam guide portion.

According to a second aspect of this invention, there is provided a method of producing a laser device comprising a laser beam guide portion containing a laser active material and an excitation beam guide portion for distributing and introducing an excitation beam into the laser beam guide portion, the method comprising the steps of:

forming a longitudinal flexible composite optical medium comprising the laser beam and the excitation beam guide portions, each of which has a long size and a flexibility and which are uncoaxially arranged in parallel to each other and integrally coupled with each other; and winding or folding the composite optical medium to form a structure of a predetermined shape.

Preferably, the forming step is for forming the longitudinal flexible composite optical medium by drawing or wire-drawing preforms of the laser beam and the excitation beam guide portions which are brought into tight contact or integrally coupled with each other.

Preferably, the winding or folding step is for winding or folding the composite optical medium to form the structure of the predetermined shape so that turned or folded parts of the excitation beam guide portion of the composite optical medium are stacked in a layered fashion.

According to a third aspect of this invention, there is provided a composite optical medium comprising:

a laser guide portion; and an excitation beam guide portion;

the laser beam guide portion comprising:

a core portion containing a laser active material; and a cladding portion coaxially surrounding the core portion;

the excitation beam guide portion being uncoaxially arranged in parallel to the laser beam guide portion and forming distributed optical coupling with the cladding portion, the composite optical medium having a long total length as compared with its sectional area to thereby be given a flexibility allowing the composite optical medium to be wound or folded.

Preferably, the laser beam guide portion and the excitation beam guide portion are integrally coupled with each other so as to extend in parallel to each other and to be aligned with each other in a transversal direction.

According to the above-mentioned aspects of this invention, the excitation beam can efficiently be introduced into the laser beam guide portion with sufficient optical coupling assured between the laser beam guide portion containing the laser active material and the excitation beam guide portion for guiding the excitation beam. Furthermore, the laser device with a high degree of freedom related to the shape can be obtained. In addition, such laser device can simply be formed.

DESCRIPTION OF THE PREFERRED EMBODIMENTS

Now, description will be made of preferred embodiments of this invention with reference to the drawing. In the figures, similar parts are designated by like reference numerals.

Referring to FIGS. 1A through 1D, a laser device according to this invention comprises a composite optical medium 3 having a sectional shape exemplified in each of FIGS. 1A through 1D.

The composite optical medium 3 is a long-sized flexible medium in a fiber-like or ribbon-like configuration. The composite optical medium 3 comprises a laser beam guide portion 1 containing a laser active material and an excitation beam guide portion 2 for introducing an excitation beam into the laser beam guide portion 1 in a distributed state. As illustrated in the figures, the laser beam guide portion 1 and the excitation beam guide portion 2 are uncoaxially arranged in parallel to each other and integrally coupled with each other. The composite optical medium 3 has a long total length as compared with its sectional area and is therefore given a flexibility such that the composite optical medium 3 can be wound or folded.

The laser beam guide portion 1 comprises a core portion 11 containing the laser active material and a cladding portion 12 coaxially surrounding the core portion 11. The laser beam guide portion 1 is adapted to perform laser oscillation in a single transverse mode by appropriately selecting the diameter of the core portion 11 and the difference in refractive index between the core portion 11 and the cladding portion 12.

The laser beam guide portion 1 and the excitation beam guide portion 2 are integrally coupled with each other so as to avoid an influence upon a waveguide structure of the laser beam guide portion 1 and so as to allow the passage of the excitation beam through a contacting portion between the cladding portion 12 and the excitation beam guide portion 2. The refractive indices of these portions are selected as follows. The core portion 11 is greater in refractive index than the cladding portion 12. The cladding portion 12 has a refractive index equal to or greater than that of the excitation beam guide portion 2.

By appropriately selecting the refractive indices of these portions as mentioned above, the excitation beam is introduced from the excitation beam guide portion 2 into the cladding portion 12 and from the cladding portion 12 into the core portion 11 to be finally absorbed into the laser active material.

As illustrated in FIGS. 1A through 1D, the laser beam guide portion 1 and the excitation beam guide portion 2 may have various sectional shapes and various arrangements exemplified in the figures.

Figure 1A:
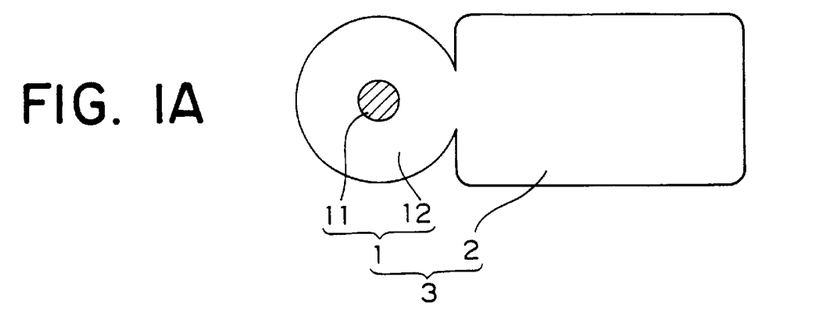
FIGS. 1A through 1D are views each of which shows a sectional shape of a composite optical medium for use in forming a laser device according to this invention.

Referring to FIG. 1A, the composite optical medium 3 has a generally ribbon-like shape in which the laser beam guide portion 1 having a circular section and the excitation beam guide portion 2 having a rectangular section are uncoaxially arranged in parallel to each other and integrally coupled with each other.

Figure 1B:
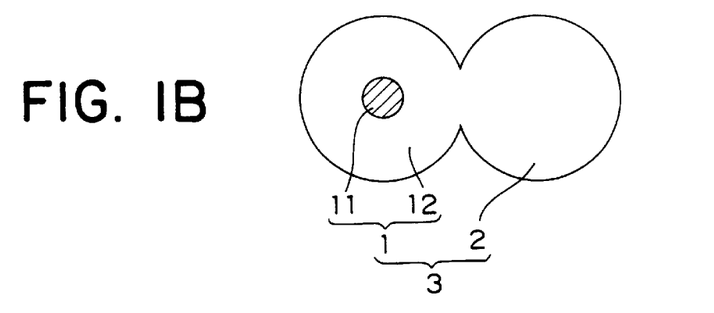

Referring to FIG. 1B, the laser beam guide portion 1 and the excitation beam guide portion 2 each of which has a circular section are uncoaxially arranged in parallel to each other and integrally coupled with each other.

Figure 1C:
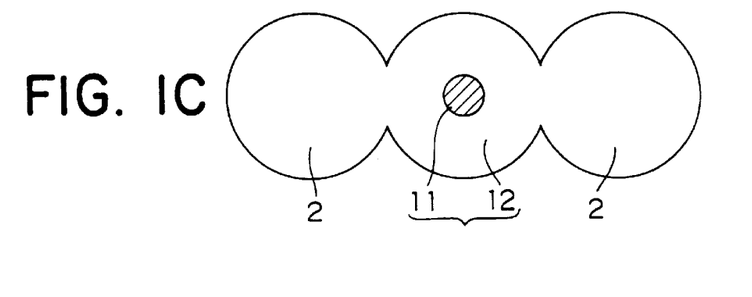
Figure 1D:
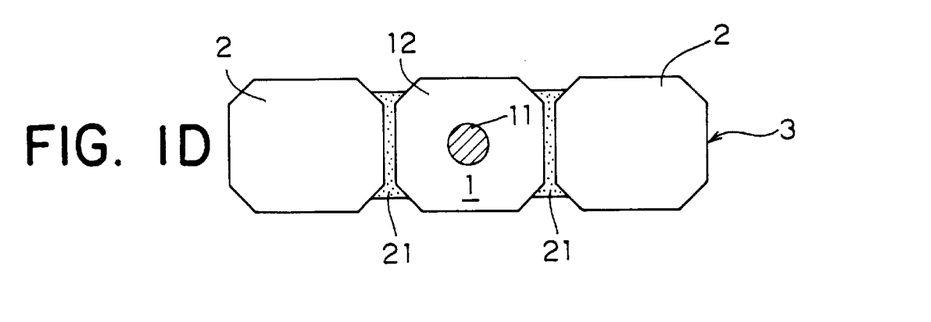

Referring to FIGS. 1C and 1D, the single laser beam guide portion 1 and the two excitation beam guide portions 2 are aligned with each other in a transversal direction and are integrally coupled with one another.

In the composite optical medium 3 illustrated in each of FIGS. 1A through 1C, the laser beam guide portion 1 and each of the excitation beam guide portions 2 are connected by fusion-bonding at the contacting portion therebetween. On the other hand, in the composite optical medium 3 illustrated in FIG. 1D, the laser beam guide portion 1 and each of the excitation beam guide portions 2 are integrally coupled with each other through an optical medium 21 made of an adhesive resin. In this case, the optical medium 21 is preferably made of a material having a refractive index adapted to introduce the excitation beam from the excitation beam guide portion 2 into the laser beam guide portion 1.

The laser device of this invention comprises a laser beam guide portion containing a laser active material and an excitation beam guide portion for introducing an excitation beam into the laser beam guide portion in a distributed state. The laser device can be easily manufactured by the use of the above-mentioned composite optical medium 3.

Specifically, the composite optical medium 3 is at first formed.

In order to form the composite optical medium 3, preforms of the laser beam guide portion 1 and the excitation beam guide portion 2 are brought into tight contact or integrally coupled with each other and are subjected to drawing or wiredrawing. In this manner, the composite optical medium 3 having a sectional shape exemplified in each of FIGS. 1A through 1C can be produced at high efficiency and high reproducibility.

Then, the composite optical medium 3 is wound or folded to form a structure of a predetermined shape.

In this process, the excitation beam guide portion can be formed in various shapes in dependence upon the manner of winding or folding the composite optical medium 3.

For example, the composite optical medium 3 is wound or folded so that turned or folded parts of the excitation beam guide portion 2 of the composite optical medium 3 are stacked in a layered fashion. In this event, the excitation beam guide portion of a disk shape or a hollow cylindrical shape can be formed.

As described above, the excitation beam guide portion of a hollow cylindrical shape or a flat disk shape is difficult to form by molding or machining an optical material such as a glass. On the other hand, according to this invention, it is readily possible to obtain a structure equivalent to the excitation beam guide portion of a hollow cylindrical shape or a flat disk shape with a long-sized flexible laser beam guide portion wound therearound.

In order to reduce the transmission loss of the excitation beam in the excitation beam guide portion, the excitation beam guide portion is required to have a structure as thin as possible. In the conventional method of molding or machining the optical material such as the glass, the thin structure inevitably requires a high machining cost. However, according to this invention, such a thin structure can be easily obtained by the use of the composite optical medium 3 mentioned above.

Furthermore, the composite optical medium 3 comprises the laser beam guide portion 1 and the excitation beam guide portion 2 preliminarily arranged uncoaxially in parallel to each other and integrally coupled with each other. Therefore, optical coupling sufficient to efficiently introduce the excitation beam at a relatively short distance is assured between the laser beam guide portion and the excitation beam guide portion formed by the composite optical medium 3.

The composite optical medium 3 can be formed into a hollow cylindrical shape, a flat disk shape, or any other shape in dependence upon the manner of winding or folding the composite optical medium 3. Thus, the degree of freedom related to the shape of the laser device can be remarkably improved.

Figure 2A:
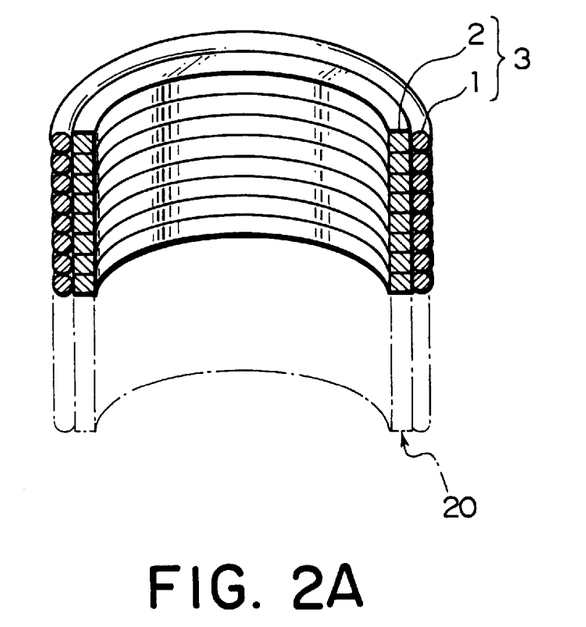
FIGS. 2A and 2B are partially sectional perspective views each of which shows an excitation beam guide structure formed by the composite optical medium according to this invention.
Figure 2B:
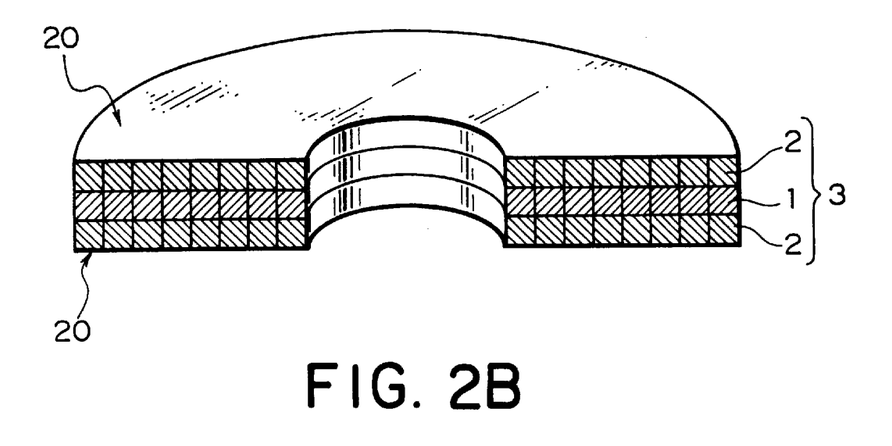

Referring to FIGS. 2A and 2B, an excitation beam guide structure 20 is formed by the above-mentioned composite optical medium 3.

Referring to FIG. 2A, the excitation beam guide structure 20 of a hollow cylindrical shape is formed by densely winding the composite optical medium 3 comprising the laser beam guide portion 1 and the excitation beam guide portion 2 in a helical fashion.

Referring to FIG. 2B, the excitation beam guide structure 2 of a disk shape is formed by densely winding the composite optical medium 3 within a single common plane.

As described above, the excitation beam guide structure 20 can readily be formed into various shapes in dependence upon the manner of winding or folding the composite optical medium 3. The excitation beam guide structure 20 thus produced serves as an excitation beam guide portion of a single-element structure if the adjacent parts of the excitation beam guide portion 2 are brought into tight contact with each other or optically coupled with each other through an appropriate optical medium.

Although not shown in the figure, the excitation beam can be introduced into the excitation beam guide structure 20 of a hollow cylindrical shape or a disk shape through any desired position on the excitation beam guide structure 20. Thus, a function equivalent to that of the conventional guide structure formed by molding or machining of the optical material such as a glass is readily achieved by the use of the above-mentioned composite optical medium 3.

The excitation beam can also be introduced through an end of the excitation beam guide portion 2 forming the composite optical medium 3. If the excitation beam guide portion 2 has a deformed cross section such as a rectangular cross section longer in one side than in the other side, it is desired to introduce the excitation beam so that the excitation beam is uniformly distributed throughout a whole of the cross section. To this end, a plurality of semiconductor laser devices may be used as an excitation light source. In this case, the semiconductor laser devices are arranged in conformity with the profile of an incident end of the excitation beam guide portion 2.

In this case, emitting surfaces of the semiconductor laser devices may be directly faced to the incident end of the excitation beam guide portion 2. However, if the excitation beam is introduced from each of the laser devices through an optical fiber to the incident end of the excitation beam guide portion 2, a high degree of freedom is assured in arrangement of the light source.

When the composite optical medium 3 is wound or folded to form the structure of a predetermined shape, use may be made of a supporting portion adapted to the predetermined shape. For example, if the composite optical medium 3 is wound in a helical fashion to form a cylindrical structure, a cylindrical supporting portion is used. By winding the composite optical medium 3 around the supporting portion, winding or folding operation can be facilitated. The supporting portion may also serves to maintain and reinforce the shape of the structure formed by winding or folding the composite optical medium 3. In addition, the supporting portion can be used as a heat radiator.

Alternatively, the supporting portion may be removed after the structure is formed by winding or folding the composite optical medium 3. In this event, the shape of the structure can be maintained or reinforced by fixing the adjacent parts of the excitation beam guide portion 2 of the composite optical medium 3 by fusion bonding or adhesion.

At least one part of the excitation beam guide portion 2 of the composite optical medium 3 may be optically connected to another part of the excitation beam guide portion 2 which is adjacent to the one part as a result of winding or folding. In this event, it is possible to further improve a guide efficiency in the excitation beam guide structure 20 formed by winding or folding the composite optical medium 3.

The above-mentioned optical connection can be carried out by the use of fusion bonding, optical contact, or resin.

At least one part of the excitation beam guide portion 2 of the composite optical medium 3 can be integrally coupled by the use of fusion bonding, optical contact, or resin with another part of the excitation beam guide portion 2 which is adjacent to the one part as a result of winding or folding, so that an integrally coupled portion is formed therebetween. In this event, an excitation beam introducing portion, such as an optical duct, a prism, a fiber, a diffraction grating, or a groove may be formed at the integrally coupled portion to introduce the excitation beam.

With this structure, it is possible to further improve the guide efficiency in the excitation beam guide structure formed by winding or folding the composite optical medium and to further efficiently introduce the excitation beam into the excitation beam guide structure.

If the excitation beam guide portion formed by winding or folding the composite optical medium is provided with a plurality of excitation beam introducing portions formed at a plurality of positions, the excitation beam can be uniformly and highly efficiently absorbed in the laser beam guide portion 1 throughout its entirety.

The shape of the excitation beam guide structure 20 formed by winding or folding the composite optical medium 3 is not restricted to the cylindrical shape or the disk shape illustrated in the figures but may be any complicated shape which can not be achieved by the conventional technique of molding or machining the optical material.

For example, the composite optical medium 3 can be helically wound so that the laser beam guide portion 1 and the excitation beam guide portion 2 are alternately arranged. Thus, the excitation beam guide structure of a helical shape can be formed. The excitation beam guide structure of such a shape can not be obtained in the conventional technique of molding or machining the optical material.

Hereinafter, the present invention will be described in detail in conjunction with specific embodiments.

Figure 3A:
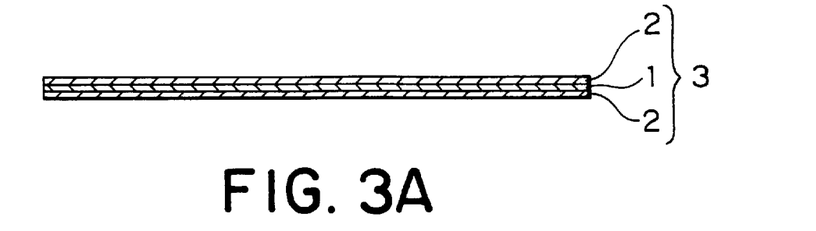
FIGS. 3A through 3C are views for describing a first embodiment of this invention.
Figure 3B:
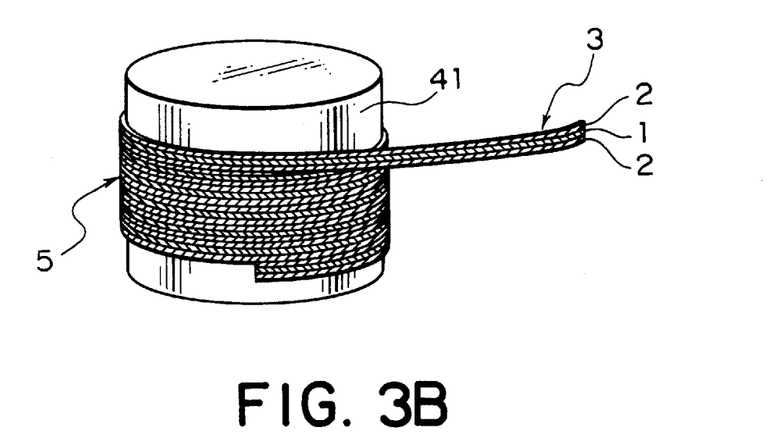
Figure 3C:
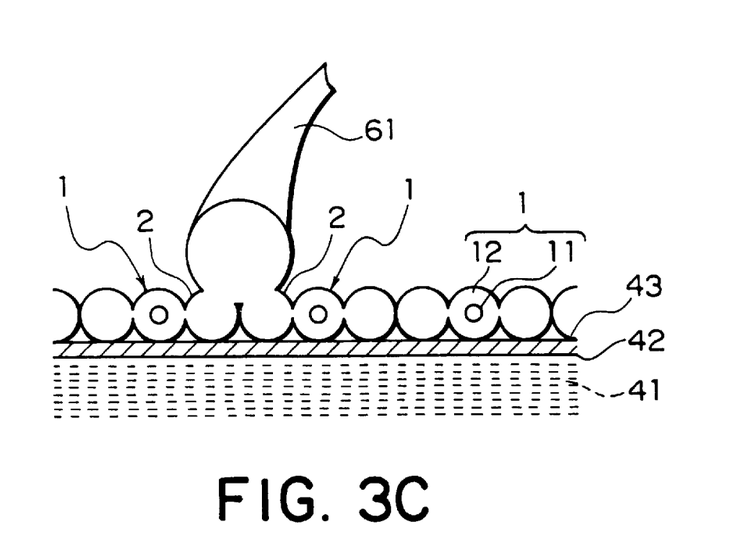

Referring to FIGS. 3A through 3C, a first embodiment of this invention will be described.

Referring to FIG. 3A, the composite optical medium 3 of a generally ribbon-like shape comprises one laser beam guide portion 1 and two excitation beam guide portions 2. The laser beam guide portion 1 and the excitation beam guide portions 2 are aligned with one another in a transversal direction and integrally coupled to one another.

At first, the composite optical medium 3 was produced as follows.

Preparation was made of a core-type preform made of a silica glass material and having a core doped with a laser active material. On the other hand, a coreless preform made of a silica glass material without a core was also prepared. A pair of coreless preforms were brought into tight contact with the core-type preform on both sides thereof, respectively, to form a linear arrangement in which the core-type preform was interposed between the coreless preforms. In this state, the three preforms were simultaneously wiredrawn to thereby produce the composite optical medium illustrated in FIG. 3A.

In this case, each of the preforms had an outer diameter of 10 mm. The core in the core-type preform had a diameter of 4 mm. The core was doped with $Nd^{3+}$ ions at the concentration of 0.5 at %.

In the composite optical medium 3 thus produced, the laser beam guide portion 1 as a core-type fiber interposed between the excitation beam guide portions 2 as coreless fibers are fusion bonded and integrally coupled to one another. Each of the guide portions 1 and 2 had a diameter of about 125 $\mu$m and the core had a diameter of 50 $\mu$m.

Next referring to FIG. 3B, a structure 5 was produced as follows.

Around an aluminum cylinder (supporting portion) 41 having an outer diameter of 10 cm, an inner diameter of 9 cm, and a length of 6 cm, the composite optical medium 3 was wound in about 120 turns corresponding to the length of about 40 m to form the helical winding structure 5. The winding was not dense but was sparse with a small pitch interval.

The cylinder 41 had a surface coated with a gold plating film 42 to provide a mirror reflection surface. On the gold plating film 42, a resin coating film 43 having a refractive index of about 1.38 was uniformly formed.

The composite optical medium 3 had one end face subjected to surface polishing and then coated with a multi-layer film having a reflectance of 98% or more at a laser oscillation wavelength of 1.06 $\mu$m. The composite optical medium 3 had the other end face which was simply cut in a vertical direction without a surface treatment and which had a reflectance of about 4% at the laser oscillation wavelength of 1.06 $\mu$m.

By the use of the structure 5, a laser device was produced as follows.

Although not shown in the figure, a LD (laser diode) device assembly (LD bar or LD array) comprising a single column of a plurality of LD devices, 19 in number, having an oscillation wavelength of 0.8 $\mu$m was used as an excitation light source for the laser device. Output beams from the LD device assembly were extracted by the use of a plurality of excitation beam introducing optical fibers having a diameter of 250 $\mu$m. Specifically, the excitation beam introducing optical fibers were arranged so that their one ends were faced to the individual LD devices, respectively. The excitation beam introducing optical fibers were coreless fibers (air cladding type) made of quartz. The number of the excitation beam introducing optical fibers was equal to 19 corresponding to 19 LD devices.

In order to position each optical fiber and each LD device face to face, use was made of a holder provided with a plurality of guide grooves, 19 in number, formed at a pitch of 500 $\mu$m although not shown in the figure. Each groove had a V-shaped section of an angle of 90°. The 19 optical fibers were positioned in the 19 guide grooves, respectively. Then, one end faces of the 19 optical fibers were directly faced to light emitting surfaces of the 19 LD devices, respectively. Thus, optical connection between the LD devices and the optical fibers was carried out at the efficiency of about 80%. Each LD device had an optical output power of about 2 W. By extracting the optical output power at the efficiency of about 80%, a total optical output power of about 30 W could be extracted.

Referring to FIG. 3C, the excitation beam introducing optical fiber depicted by 61 had the other end illustrated in the figure. The other end of each optical fiber 61 was connected by fusion bonding to the excitation beam guide portion 2 of the composite optical medium 3 forming the above-mentioned structure 5. At this time, the other end of each optical fiber 61 was fusion bonded over two adjacent ones of the excitation beam guide portions 2. The fusion bonding was performed once per six turns of the composite optical medium 3. As a whole, the fusion bonding was performed at 19 positions in total corresponding to 19 optical fibers 61.

In the above-mentioned manner, the laser device was produced in which the output beams from the 19 LD devices were distributed and introduced as the excitation beams into 19 positions of the above-mentioned structure 5.

In this embodiment, the optical output power of 2 W from each LD device was extracted at the efficiency of 80% so that the excitation beam of about 30 W was introduced into the above-mentioned structure 5. Thus, it was possible to achieve a laser output as high as 13 W at the wavelength of 1.06 $\mu$m.

In this embodiment, the other end of the excitation beam introducing optical fiber 61 was fusion bonded over two adjacent coreless fibers as the excitation beam guide portions 2 as illustrated in FIG. 3C. Thus, the excitation beam can be efficiently introduced without an adverse influence upon the waveguide structure of the laser fiber, i.e., the laser beam guide portion 1. Therefore, stable and excellent laser oscillation is possible without variation in laser oscillation characteristic.

In this embodiment, the excitation beam introducing optical fiber 61 made of a glass was connected by fusion bonding at every 6 turns of the composite optical medium 3. By distributing the introduction of the excitation beam to a plurality of positions, the excitation beam can be uniformly and efficiently absorbed into the laser beam guide portion 1 throughout its entirety. Furthermore, in this embodiment, the excitation beam is substantially completely prevented from being emitted from each connecting portion to the outside.

In the foregoing embodiment, two adjacent ones of the excitation beam guide portions 2 are not connected as illustrated in FIG. 3C. Alternatively, two adjacent ones of the excitation beam guide portions 2 may be connected by fusion bonding using a $CO_2$ laser.

The excitation beam introducing optical fiber 61 is connected to the excitation beam guide portions 2 by fusion bonding in the foregoing embodiment. Alternatively, connection may be carried out by the use of an intermediate medium, such as resin, which serves as both an adhesive and an optical material.

Second Embodiment

Figure 4A:
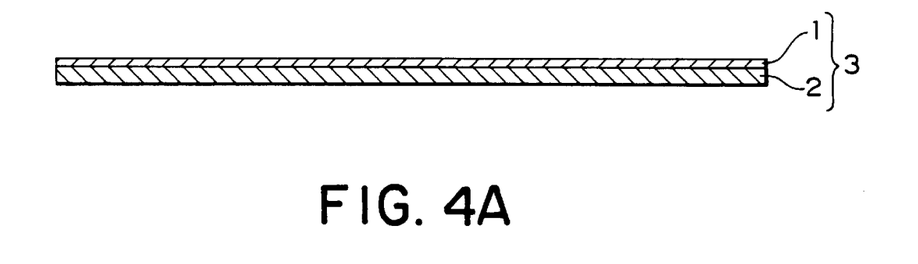
FIGS. 4A and 4B are views for describing a second embodiment of this invention.
Figure 4B:
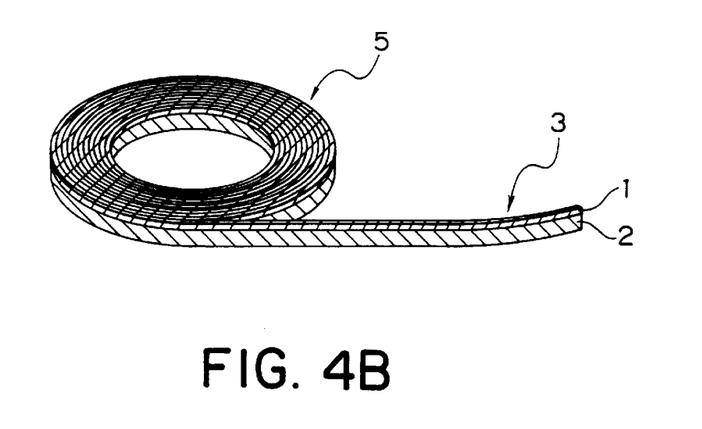

Referring to FIGS. 4A and 4B, a second embodiment of this invention will be described.

Referring to FIG. 4A, the composite optical medium 3 comprises a pair of the single laser beam guide portion 1 and the single excitation beam guide portion 2 integrally coupled with each other.

At first, the composite optical medium 3 was produced as follows.

Preparation was made of a core-type preform made of a silica glass material and having a core doped with a laser active material. On the other hand, a coreless preform made of a silica glass material without a core was also prepared. The core-type preform and the coreless preform were arranged in tight contact with each other. In this state, the preforms were simultaneously wiredrawn to form the composite optical medium 3 illustrated in FIG. 4A.

In the core-type preform for the laser beam guide portion 1, each of the core and the cladding had a circular section. The cladding portion had an outer diameter of 10 mm while the core had a diameter of 4 mm. The core was doped with $Nd^{3+}$ ions at the concentration of 0.5 at %.

The coreless preform for the excitation beam guide portion 2 had a substantially rectangular cross section of 10 mm×20 mm. On the short side of the rectangular section, the preform for the laser beam guide portion 1 was arranged. Then, wiredrawing was carried out.

The composite optical medium 3 thus produced had a structure in which the laser beam guide portion 1 having a diameter of about 125 μm is fusion-bonded to the excitation beam guide portion 2 of a generally ribbon-like flat shape having a rectangular cross section of about 125 μm×250 μm. The core in the laser beam guide portion 1 had a diameter of about 50 μm.

Next referring to FIG. 4B, the structure 5 was formed as follows.

As illustrated in the figure, the composite optical medium 3 was wound in a spiral fashion so that the long sides of the excitation beam guide portion 2 overlap one another. As a consequence, the disk-shaped structure 5 having an inner diameter of about 60 mm, an outer diameter of about 100 mm, and a thickness of about 375 μm was prepared.

Figure 5:
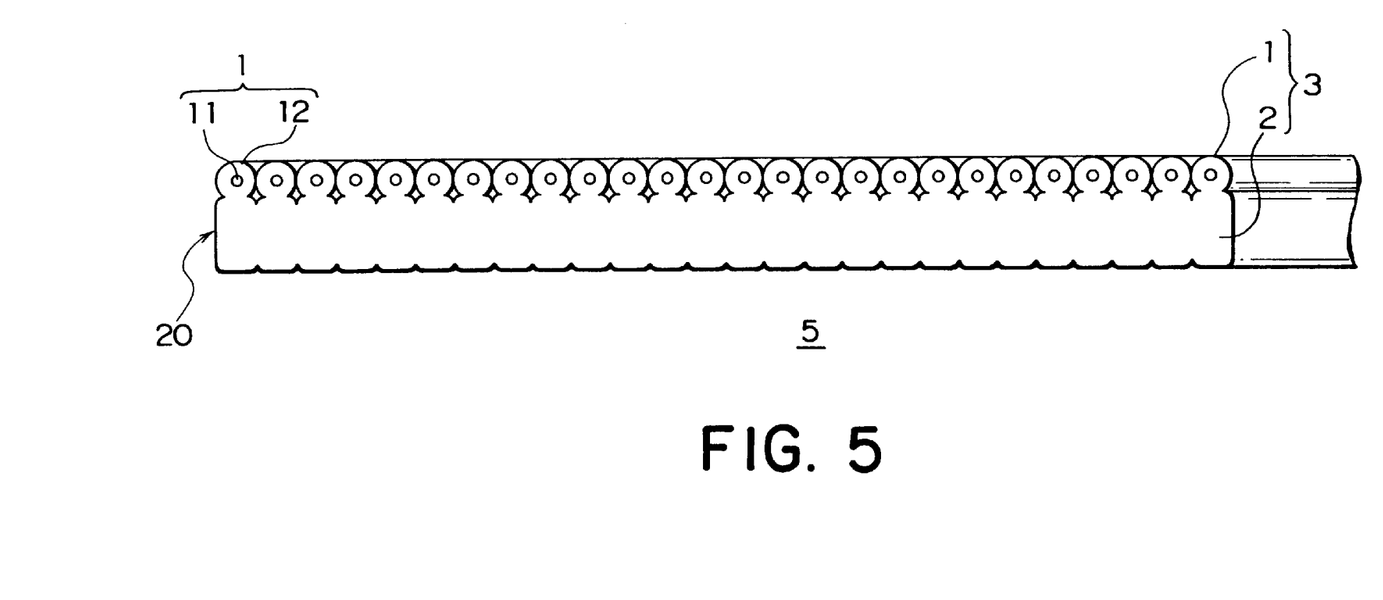
FIG. 5 is a sectional view of an excitation beam guide portion wound into a disk shape.

While the composite optical medium 3 was wound, a $CO_2$ laser was selectively irradiated onto the excitation beam guide portion 2. As a consequence, adjacent parts of the excitation beam guide portion 2 wound in a disk shape were connected by fusion bonding as illustrated in FIG. 5 to form a glass disk having a substantially uniform thickness of 375 μm. The glass disk can be understood as an integral structure.

In FIG. 5, adjacent parts of the excitation beam guide portion 2 wound in a disk shape were fusion bonded and connected to one another.

The laser beam guide portion 1 was wound along the surface of the glass disk. The laser beam guide portion 1 had one end face preliminarily subjected to optical polishing and then coated with a multi-layer film having a reflectance of 98% or more at the laser oscillation wavelength of 1.06 μm.

The laser beam guide portion 1 had the other end face which was simply cut in the vertical direction without a surface treatment and which had a reflectance of about 4% at the laser oscillation wavelength of 1.06 μm.

By the use of the structure 5 formed as mentioned above, laser oscillation was carried out. As an excitation light source, use was made of an LD device assembly comprising a plurality of LD devices having an oscillation wavelength of 0.8 μm. Output beams of the LD devices were individually introduced through a plurality of excitation beam introducing optical fibers into the excitation beam guide portion 2 forming the disk-shaped structure.

In this case, the excitation beam introducing optical fibers were connected to the excitation beam guide portion 2 by fusion bonding in the manner similar to that mentioned in conjunction with the first embodiment. The connecting portions were distributed so that the excitation beam was uniformly introduced. With this structure, the laser output of 7 W was produced from an output end of the laser beam guide portion 1 at the wavelength of 1.06 μm.

In this embodiment, a fiber laser of the disk-shaped structure can readily be produced by the use of the composite optical medium 3. In addition, as compared with the cylindrical structure, the laser device is small in size. Since the disk structure formed by winding the composite optical medium 3 can be considerably reduced in thickness, the transmission loss of the excitation beam is suppressed and the radiation efficiency is excellent.

In the first and the second embodiments mentioned above, use was made of the one-to-one composite optical medium 3 comprising a pair of one laser beam guide portion 1 and one excitation beam guide portion 2. Alternatively, use may be made of the one-to-two composite optical medium 3 comprising one laser beam guide portion 1 and two excitation beam guide portions 2 arranged on both sides thereof. In this case, it is possible to produce a laser fiber equivalent to the structure comprising the laser beam guide portion and thin-plate excitation beam guide portions arranged on both sides thereof. With this structure, a greater amount of the excitation beam can be efficiently introduced so that the laser output power can be increased further.

In each of the first and the second embodiments mentioned above, the excitation beam is introduced into the excitation beam guide portion through the connecting portions of the optical glass fibers for introducing the excitation beam. Alternatively, if the excitation beam guide portion 2 has an integral disk-shaped structure formed by winding and fusion bonding, a prism for introducing the excitation beam may be provided at a part of the disk-shaped structure to introduce the excitation beam.

Alternatively, the prism may be replaced by an excitation structure in which a semiconductor laser beam is directly introduced into disk surfaces (front and rear surfaces) of the integral structure.

As described above, a laser device of the first invention comprises a long-sized flexible composite optical medium composed of a laser beam guide portion containing a laser active material and an excitation beam guide portion for introducing an excitation beam into the laser beam guide portion in a distributed state. The laser beam guide portion and the excitation beam guide portion are uncoaxially arranged in parallel to each other and integrally coupled with each other. The composite optical medium is wound or folded to form a predetermined shape.

With this structure, sufficient optical coupling is assured between the laser beam guide portion containing the laser active material and the excitation beam guide portion for guiding the excitation beam. Therefore, the excitation beam can efficiently be introduced into the laser beam guide portion and a high degree of freedom related to the shape can be achieved.

In the second invention, at least one part of the excitation beam guide portion of the composite optical medium is optically connected to another part of the excitation beam guide portion which is adjacent to the one part as a result of winding or folding.

With this structure, it is possible to further improve the guide efficiency in the excitation beam guide structure formed by winding or folding the composite optical medium.

In the third invention, at least one part of the excitation beam guide portion of the composite optical medium is integrally coupled by the use of fusion-bonding, optical contact, or resin to another part of the excitation beam guide portion which is adjacent to the one part as a result of winding or folding.

With this structure, it is possible to further improve the guide efficiency in the excitation beam guide structure formed by winding or folding the composite optical medium.

In the fourth invention, at least one part of the excitation beam guide portion of the composite optical medium is integrally coupled by the use of fusion-bonding, optical contact, or resin with another part of the excitation beam guide portion which is adjacent to the one part as a result of winding or folding, so that an integrally coupled portion is formed therebetween. The laser device further comprises an excitation beam introducing portion, such as an optical duct, a prism, a fiber, a diffraction grating, or a groove, formed at the integrally coupled portion to introduce the excitation beam.

With this structure, it is possible to further improve the guide efficiency in the excitation beam guide structure formed by winding or folding the composite optical medium and to further efficiently introduce the excitation beam into the structure.

In the fifth invention, the laser device is provided with a plurality of excitation beam introducing portions formed at a plurality of positions of an excitation beam guide portion obtained by winding or folding the composite optical medium.

With this structure, the excitation beam can be uniformly and efficiently absorbed into the laser beam guide portion 1 throughout its entirety.

In the sixth invention, a method of producing a laser device comprises a laser beam guide portion containing a laser active material and an excitation beam guide portion for introducing an excitation beam into the laser beam guide portion in a distributed state, the method comprising the steps of:

forming a long-sized flexible composite optical medium composed of a laser beam guide portion and an excitation beam guide portion both of which has a long size and a flexibility and which are uncoaxially arranged in parallel to each other and integrally coupled with each other; and winding or folding the composite optical medium to form a structure of a predetermined shape.

With this structure, it is possible to easily produce the optical guide structure capable of guiding the excitation beam at a high guide efficiency so that a high-efficiency laser device is obtained and to achieve a high degree of freedom related to the shape. Thus, it is possible to avoid the difficulty in molding or machining the optical material such as a glass.

In the seventh invention, the long-sized flexible composite optical medium is formed by drawing or wiredrawing preforms of the laser beam guide portion and the excitation beam guide portion which are brought into tight contact or integrally coupled with each other.

With this structure, it is possible to efficiently produce the long-sized flexible composite optical medium comprising the laser beam guide portion and the excitation beam guide portion each of which has a long size and a flexibility and which are uncoaxially arranged in parallel to each other and integrally coupled with each other.

In the eighth invention, the excitation beam guide portion of a predetermined shape is formed by winding or folding the composite optical medium so that turned or folded parts of the excitation beam guide portion of the composite optical medium are stacked in a layered fashion.

With this method, the excitation beam guide portion of an integral structure is produced to further efficiently introduce the excitation beam.

In the ninth invention, a composite optical medium is composed of a laser beam guide portion comprising a core portion containing a laser active material and a cladding portion coaxially surrounding the core portion and an excitation beam guide portion extending in parallel to the laser beam guide portion to be uncoaxial therewith and forming distributed optical coupling with the cladding portion. The composite optical medium has a long total length as compared with its sectional area to thereby be given a flexibility allowing the composite optical medium to be wound or folded.

With this structure, the optical guide structure having a high guide efficiency for the excitation beam can readily be produced with a high degree of freedom related to the shape. Thus, it is possible to avoid the difficulty in molding or machining the optical material such as a glass.

In the tenth invention, the laser beam guide portion and the excitation beam guide portion are integrally coupled with each other so as to extend in parallel to each other and to be aligned with each other in a transversal direction.

With this structure, it is possible to readily form an integral structure by stacking the parts of the excitation beam guide portion.

As is obvious from the foregoing, according to this invention, use is made of a longitudinal or long-sized flexible composite optical medium which comprises a laser beam guide portion containing a laser active material and an excitation beam guide portion for distributing and introducing an excitation beam into the laser beam guide portion. The laser beam guide portion and the excitation beam guide portion are uncoaxially arranged in parallel to each other and integrally coupled with each other. The composite optical medium is wound or folded to form a predetermined shape. With this structure, it is possible to easily produce the laser device which assures sufficient optical coupling between the laser beam guide portion and the excitation beam guide portion so as to efficiently introduce the excitation beam into the laser beam guide portion and which has a high degree of freedom related to the shape.

What is claimed is:

1. A laser device comprising a longitudinal flexible composite optical medium which comprises:

a laser beam guide portion, which comprises a core portion containing a laser active material and a cladding portion surrounding said core portion; and an excitation beam guide portion, including a no core portion, for distributing and introducing an excitation beam into said laser beam guide portion;

said laser beam guide portion and said excitation beam guide portion being uncoaxially arranged in parallel to each other and integrally coupled with each other, said composite optical medium being wound or folded to form a predetermined shape, said predetermined shape being a hollow cylindrical shape formed so that turned or folded parts of the excitation beam guide portion of said composite optical medium are stacked in a layered fashion, a first part of said excitation beam guide portion of said composite optical medium being optically connected, in said predetermined shape, to a second part of said excitation beam guide portion which is adjacent to said first part.

2. A laser device as claimed in claim 1, wherein, in said predetermined shape, said first part of said excitation beam guide portion of said composite optical medium is integrally coupled by the use of fusion-bonding or resin to said second part of said excitation beam guide portion.

3. A laser device as claimed in claim 1, wherein, in said predetermined shape, said first part of said excitation beam guide portion of said composite optical medium is integrally coupled, to form an integrally coupled portion, by the use of fusion-bonding or resin to said second part of said excitation beam guide portion, said laser device further comprising an excitation beam introducing portion formed at said integrally coupled portion for introducing the excitation beam into said excitation beam guide portion.

4. A laser device as claimed in claim 1, further compromising a plurality of excitation beam introducing portions formed at a plurality of positions of said excitation beam guide portion of said composite optical medium wound or folded, said excitation beam introducing portions being for introducing the excitation beam into said excitation beam guide portion.

5. A method of producing a laser device comprising a laser beam guide portion and an excitation beam guide portion for distributing and introducing an excitation beam into said laser beam guide portion, said method comprising the steps of:

preparing the beam guide portion, which comprises a core portion containing a laser active material and a cladding portion surrounding said core portion;

preparing the excitation beam guide portion, including no core portion;

forming a longitudinal flexible composite optical medium comprising said laser beam guide portion and said excitation beam guide portion, each of said laser beam guide portion and said excitation beam guide portion having a long size and a flexibility, said laser beam guide portion and said excitation beam guide portion being uncoaxially arranged in parallel to each other and integrally coupled with each other; and winding or folding said composite optical medium to form a structure of a predetermined shape, being a hollow cylindrical shape, so that turned or folded parts of the excitation beam guide portion of said composite optical medium are stacked in a layered fashion, a first part of said excitation beam guide portion of said composite optical medium being optically connected, in said predetermined shape, to a second part of said excitation beam guide portion which is adjacent to said first part.

6. A method as claimed in claim 5, wherein said forming step is for forming said longitudinal flexible composite optical medium by drawing or wiredrawing preforms of said laser beam guide portion and said excitation beam guide portion, said laser beam guide portion and said excitation beam guide portion being brought into tight contact or integrally coupled with each other.

7. A method of producing a laser device comprising a laser beam guide portion and an excitation beam guide portion for distributing and introducing an excitation beam into said laser beam guide portion, said method comprising the steps of:

preparing the beam guide portion which comprises a core portion containing a laser active material and a cladding portion surrounding said core portion;

preparing the excitation beam guide portion including a no core portion;

forming a longitudinal flexible composite optical medium comprising said laser beam guide portion and said excitation beam guide portion, each of said laser beam guide portion and said excitation beam guide portion having a long size and a flexibility, said laser beam guide portion and said excitation beam guide portion being uncoaxially arranged in parallel to each other and integrally coupled with each other; and winding or folding said composite optical medium to form a structure of a predetermined shape, being a disk shape, so that turned or folded parts of the excitation beam guide portion of said composite optical medium are positioned within a single plane, a first part of said excitation beam guide portion of said composite optical medium being optically connected, in said predetermined shape, to a second part of said excitation beam guide portion which is adjacent to said first part.

8. A method as claimed in claim 7, wherein said forming step is for forming said longitudinal flexible composite optical medium by drawing or wiredrawing preforms of said laser beam guide portion and said excitation beam guide portion, said laser beam guide portion and said excitation beam guide portion being brought into tight contact or integrally coupled with each other.

* * * * *